US009243975B2

(12) United States Patent
Taylor

(10) Patent No.: US 9,243,975 B2
(45) Date of Patent: Jan. 26, 2016

(54) POLARIZATION MODE DISPERSION MEASUREMENT BY OBSERVATION OF DATA-BEARING SIGNALS

(75) Inventor: Michael G. Taylor, Laurel, MD (US)

(73) Assignee: Tektronix, Inc., Beaverton, OR (US)

( * ) Notice: Subject to any disclaimer, the term of this patent is extended or adjusted under 35 U.S.C. 154(b) by 23 days.

(21) Appl. No.: 13/558,618

(22) Filed: Jul. 26, 2012

(65) Prior Publication Data

US 2013/0201473 A1 Aug. 8, 2013

Related U.S. Application Data

(60) Provisional application No. 61/537,381, filed on Sep. 21, 2011.

(51) Int. Cl.
*G01N 21/00* (2006.01)
*G01M 11/00* (2006.01)

(52) U.S. Cl.
CPC .................... *G01M 11/336* (2013.01)

(58) Field of Classification Search
CPC ................ G01J 4/00; G01M 11/336
USPC .................................... 356/73, 73.1
See application file for complete search history.

(56) References Cited

U.S. PATENT DOCUMENTS

| 6,839,129 | B1* | 1/2005 | Savory | 356/73.1 |
|---|---|---|---|---|
| 6,856,400 | B1* | 2/2005 | Froggatt | 356/477 |
| 6,947,129 | B1* | 9/2005 | Lu et al. | 356/73.1 |
| 2007/0175034 | A1* | 8/2007 | Pan | 29/890.03 |
| 2007/0280689 | A1* | 12/2007 | Boffi et al. | 398/65 |
| 2009/0268198 | A1* | 10/2009 | Brendel | 356/73.1 |
| 2010/0232809 | A1* | 9/2010 | Cai et al. | 398/202 |

OTHER PUBLICATIONS

Lasers and Electro-Optics Society, 2004. LEOS 2004. The 17th Annual Meeting of the IEEE, Nov. 7-11, 2004, vol. 1, p. 88-89, Misha Boroditsky, et al.
Second-Order PMD Monitoring from Adaptive FIR-Filter Tap Coefficients in a Digital Coherent Receiver, Faruk, et al. OSA/OFC/NFOEC 2011.
Statistical Theory of Polarization Dispersion in Single Mode Fibers, G. J. Foschini and C. D. Poole, Journal of Lightwave Technology, vol. 9. No. 11. Nov. 1991.
Channel Parameter Estimation for Polarization Diverse Coherent Receivers, J. C. Geyer, et al., IEEE Photonics Technology Letters, vol. 20, No. 10, May 15, 2008.
Automated Measurement of Polarization Mode Dispersion Using Jones Matrix Eigenanalysis, B. L. Heffner, IEEE Photonics Technol. oc;y Letters. vol. 4. No. 9. Sep. 1992.

(Continued)

*Primary Examiner* — Tarifur Chowdhury
*Assistant Examiner* — Omar Nixon
(74) *Attorney, Agent, or Firm* — Marger Johnson; Thomas F. Lanihan

(57) ABSTRACT

Embodiments of the invention include systems and methods for measuring or otherwise calculating polarization mode dispersion (PMD) of an optical fiber, or other device, by comparing the optical signal through the PMD element with the optical signal obtained directly from the transmitter, and calculating the PMD from the discrepancy between the two. Any distortions on the transmitter signal are effectively calibrated out, increasing measurement accuracy over conventional approaches.

25 Claims, 7 Drawing Sheets

(56) References Cited

OTHER PUBLICATIONS

Accurate, Automated Measurement of Differential Group Delay Dispersion Using Jones Matrix Eigenanalysis, Brian L. Heffner, Instruments and Photonics Laboratory HPL-92-146 Nov. 1992.

PMD monitoring in traffic-carrying optical systems and its statistical analysis, Junfeng Jiang, Sathyanarayanan, Sundhararajan, Doug Richards, Steve Oliva, and Rongqing Hui, ©2008 Optical Society of America OCIS codes: (060. 2330) Fiber optics communications; (260.5430) Polarization.

Quaternion Approach to PMD and PDL Phenomena in Optical Fiber Systems, Magnus Karlsson, Journal of Lightwave Technology, vol. 22, No. 4, Apr. 2004.

Method for PMD Vector Monitoring in Picosecond Pulse Transmission Systems, Lothar Moller and Larry Buhl, Journal of Lightwave Technology, vol. 19, No. 8, Aug. 2001.

Implementation Agreement for Integrated Dual Polarization Intradyne Coherent Receivers, IA# OIF_DPC_RX-01.1, Sep. 20, 2011.

Measurement of polarization-mode dispersion in single-mode fibers with random mode coupling, C. D. Poole, May 15, 1989 / vol. 14, No. 10 / Optics Letters.

Coherent Frequency-Selective Polarimeter for Polarization-Mode Dispersion Monitoring, I. Roudas, G. A. Piech, M. Mlejnek, Y. Mauro, D. Q. Chowdhury, Journal of Lightwave Technology, vol. 22, No. 4, Apr. 2004.

* cited by examiner

POLARIZATION MODE DISPERSION MEASUREMENT BY OBSERVATION OF DATA-BEARING SIGNALS

CROSS-REFERENCES TO RELATED APPLICATIONS

This application claims the benefit of commonly assigned U.S. Provisional Application No. 61/537,381, filed Sep. 21, 2011, which is hereby incorporated by reference in its entirety.

BACKGROUND

Embodiments of the present invention relate to the measurement of polarization mode dispersion (PMD) in fiber optics, and more particularly, to systems and methods for measuring PMD by observation of data-bearing signals.

The transmission of information on beams of light sent through optical fibers is a large and active industry. The information, in the form of logical 0's and 1's, is modulated onto the light beam. For many years, the mode of modulation was to switch the light on and off. Recently, advanced modulation formats have been deployed, which allow more than one bit of information to be encoded on each modulated symbol. The phase and the state of polarization (SOP) of the light may be modulated in these advanced modulation formats. Polarization multiplexing may be employed, where two signals are combined on orthogonal SOPs so as to double the information carried. For example, the dual polarization quadrature phase shift keying format (DP-QPSK) is one such conventional method. While direct detection was sufficient for on-off modulated signals, a more complex type of detection called coherent detection is typically required to receive the advanced modulation formats. The difference between direct detection and coherent detection is known among people with skill in the art and is explained in the book "Fiber-Optic Communication Systems" by G. P. Agrawal (Wiley, 2nd Ed., 1997).

Another technology that has been applied in fiber optic receivers recently is digital signal processing (DSP). Previously the processing executed in a fiber optic receiver was quite simple. An electrical circuit made a decision whether the optical power was above or below a certain threshold, to declare whether a symbol was a logical 1 or logical 0. With DSP, electrical signals within the receiver are digitized, that is, converted into a sequence of numerical values, which are then acted on by a series of arithmetic operations to eventually compute the information content of the signal. Digital signal processing performs the extra operations needed for coherent detection, compared to direct detection. The DSP receiver has an additional advantage. The optical signal may be distorted by propagation through the optical fiber, and digital signal processing operations may be applied within the receiver to correct for the fiber propagation impairments. Some of these impairments, such as PMD, vary over time. The DSP is able to track the variation, and continue to correct for the impairment as it varies. While there are adaptive equalization algorithms that correct for an impaired signal without knowing the nature of the impairment, it is often more efficient to apply an algorithm that first estimates the amount of impairment and then corrects for it.

The optical signal may propagate over a large distance of optical fiber, hundreds or thousands of kilometers, before it is detected and the information content extracted. The signal decays due to fiber attenuation, but it may pass though many optical amplifiers, each one boosting the signal to a high power. The optical amplifiers do not correct for any impairments, so propagation impairments accumulate over the full distance between transmitter and receiver.

Fiber optic communication systems typically employ wavelength division multiplexing (WDM), which means that several optical signals are sent over the fiber in parallel, at different wavelengths. The WDM channels are grouped in bands, depending on what kind of optical amplifier is used. The most common band to be used is the C-band, which is 35 nanometers (nm) wide centered on 1550 nm. Each WDM channel occupies a small range of wavelengths. For example, a 28Gbaud DP-QPSK signal typically occupies 19 gigahertz (GHz) of optical spectrum, which is equal to 150 picometers (pm) in wavelength terms in the C-band.

Polarization mode dispersion is one of the most important fiber propagation impairments. When a fiber has PMD, it means that light in one state of polarization travels faster than light in the other (i.e., the orthogonal) SOP. Typically, a signal may lie in a mix of both the fast and slow SOPs, and at the receiver, the signal is distorted because light from one symbol arrives on top of light from a preceding symbol. This is referred to as inter-symbol interference. The root cause of PMD is that the fiber has birefringence because it is not perfectly circular, or because it is under strain due to a bend in the fiber. Birefringence means that the refractive index (which controls the speed of light) is different between two orthogonal states of polarization. A complicating feature is that the axes of birefringence, the fast and slow polarization states, typically do not align over the length of the fiber, but are randomly oriented from one section of fiber to the next. Also, the alignment between sections effectively changes over time as the stress on the fiber changes due to temperature, or if a fiber cable is moved. This means that the effect of PMD on the signal is different for different WDM channels, and the effect on any one WDM channel varies over time, perhaps as quickly as a few milliseconds.

In general, there are two ways to characterize the polarization mode dispersion of a long length of fiber. Both measured quantities are sometimes called "PMD," although there is an important difference between the two measured quantities. In one mode, the average PMD is measured by sending a broadband light source, whose spectrum is many nanometers wide, through the fiber. The average PMD is reported as a single value in time units (e.g., a number of picoseconds), which represents the average (root mean square) amount of time delay between the fast and slow SOPs. The average can be expressed over time and wavelength. Alternatively, the instantaneous PMD, seen by one WDM channel at one time, may be measured. It is the instantaneous PMD that is of interest if one wants to compensate for the PMD seen by an optical signal, and there is no benefit in this situation in knowing the average PMD of the fiber. As used herein, any further mention of "PMD" refers to the instantaneous PMD.

The PMD is expressed as a set of coefficients, where each coefficient is a three dimensional vector quantity. The first coefficient is called the first order PMD, and is also known as the differential group delay. Often only the first order PMD needs to be known to fully describe how PMD affects a WDM channel. A more complete explanation of the first order PMD is given in "Measurement of polarization-mode dispersion in single-mode fibers with random mode coupling" by C. D. Poole (Opt. Lett., vol. 14, pp. 523-525, 1989). When the PMD is large enough that it varies across the bandwidth of a WDM channel, it is necessary to include the second order and higher PMD coefficients to describe it fully. A more complete explanation of the higher order coefficients is provided in "Statistical Theory of Polarization Dispersion in Single Mode Fibers" by G. J. Foschini and C. D. Poole (IEEE J. Lightwave Technol., vol. 9, p. 1439-1456, 1991). The second order PMD is the derivative, that is, the rate of change with optical frequency, of the first order PMD. The third order PMD is the derivative of the second order PMD, and so on.

One way to measure the PMD coefficients of a fiber span is the Jones matrix eigenanalysis (JME) method, described in "Automated Measurement of Polarization Mode Dispersion Using Jones Matrix Eigenanalysis" by B. L. Heffner (IEEE Phot. Tech. Lett., vol. 4, p. 1066-1069, 1992) and "Accurate, Automated Measurement of Differential Group Delay Dispersion and Principal State Variation Using Jones Matrix Eigenanalysis" by B. L. Heffner (IEEE Phot. Tech. Lett., vol. 5, p. 814-817, 1993). The JME method is based on the property of PMD that it causes the state of polarization to change as the wavelength is changed. A tunable laser is sent through the optical fiber in the wavelength region of interest, and the output SOP is observed on a polarimeter, an instrument that measures state of polarization, as the laser is tuned in wavelength. A disadvantage of this method is that it cannot be used to measure the PMD of an in-service WDM channel. The signal would have to be switched off to allow light from the tunable laser to pass through the fiber and be received by the polarimeter.

There are measurement methods that act on an information-bearing signal directly, and can be applied to in-service signals. When the signal is polarized, then PMD has the effect of partially depolarizing the signal. The degree of depolarization can be used to estimate the PMD, as described in "Method for PMD Vector Monitoring in Picosecond Pulse Transmission Systems" by L. Moller and L. Buhl (IEEE J. Lightwave Technol., vol. 19, p. 1125-1129, 2001) and "PMD monitoring in traffic-carrying optical systems and its statistical analysis" by J. Jiang et al. (Optics Express, vol. 16, p. 14057-14063, 2008). This method only works on single polarization signals, and does not work on polarization multiplexed signals.

Another method described in "Channel Parameter Estimation for Polarization Diverse Coherent Receivers" by J. C. Geyer et al. (IEEE Phot. Tech. Lett., vol. 20, p. 776-778, 2008) does work with polarization multiplexed signals. The signal at the output of the optical fiber is detected by a coherent receiver and digitized. An adaptive equalization process is applied to the digitized representation to try to improve the signal. Then the PMD is calculated from the converged coefficients of the adaptive equalizer, based on the assumption that PMD has caused the impairment to the signal. This method may be inaccurate if the signal is impaired by a different mechanism from PMD. For example, a realistic optical transmitter might have the signal on one polarization delayed by 5 ps compared to the signal on the other polarization. The adaptive equalization algorithm would conclude incorrectly that the signal has been impaired by 5 ps of first order PMD, when in fact the impairment appears at the output of the transmitter.

Accordingly, a need remains for a method to estimate the PMD associated with an optical signal by observing the signal itself. There is a need for the PMD estimation method to work with polarization multiplexed signals, and for the method to be accurate even if the signal is impaired by a different mechanism in addition to PMD. Finally, there is a need for a PMD measurement that works when the state of polarization of the signal is varying at the speeds sometimes seen in fiber optic links. Embodiments of the invention address these and other limitations in the prior art.

The foregoing and other features and advantages of the inventive concepts will become more readily apparent from the following detailed description of the example embodiments, which proceeds with reference to the accompanying drawings.

DETAILED DESCRIPTION

Reference will now be made in detail to embodiments of the present invention, examples of which are illustrated in the accompanying drawings. In the following detailed description, numerous specific details are set forth to enable a thorough understanding of the inventive concepts. It should be understood, however, that persons having ordinary skill in the art may practice the inventive concepts without these specific details. In other instances, well-known methods, procedures, components, circuits, and networks have not been described in detail so as not to unnecessarily obscure aspects of the embodiments.

It will be understood that, although the terms first, second, etc. may be used herein to describe various elements, these elements should not be limited by these terms. These terms are only used to distinguish one element from another. For example, a first receiver could be termed a second receiver, and, similarly, a second receiver could be termed a first receiver, without departing from the scope of the inventive concept.

The terminology used in the description of the various embodiments herein is for the purpose of describing particular embodiments only and is not intended to be limiting of the inventive concepts. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The components and features of the drawings are not necessarily drawn to scale.

Embodiments of the invention include a system, method, and apparatus for more accurately measuring PMD in fiber optics by observation of data-bearing signals.

I. Transmission System Configuration

Figure 1:
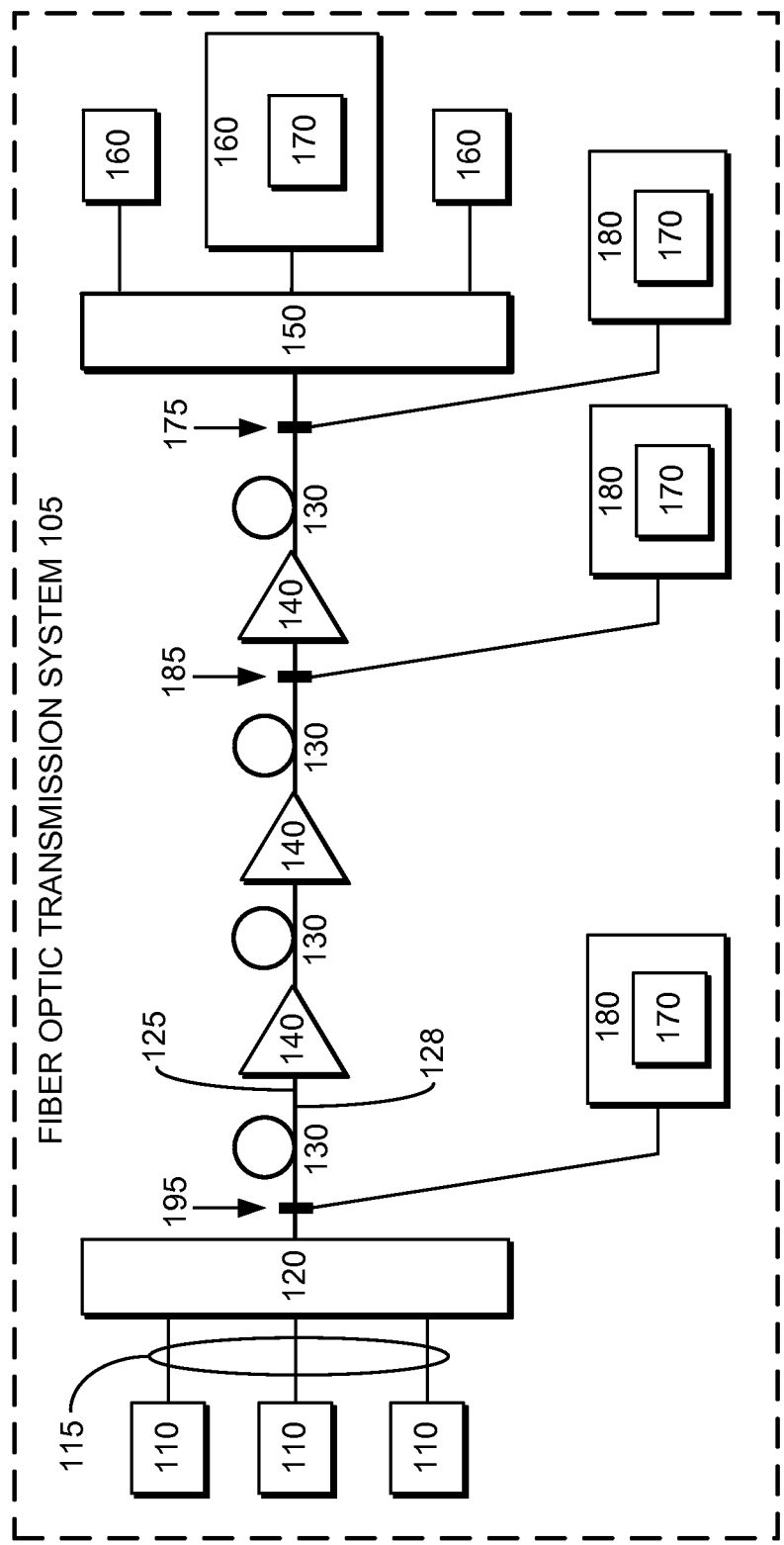
FIG. 1 is an example diagram of a fiber optic transmission system including PMD measurement logic in accordance with embodiments of the present invention.

FIG. 1 is an example diagram of a fiber optic transmission system 105 including PMD measurement logic 170 in accordance with embodiments of the present invention. The PMD measurement logic 170 can include software code, firmware, an application specific integrated circuit (ASIC), a field programmable gate array (FPGA), a hardware circuit, or any suitable combination thereof. One or more transmitters 110 are configured to transmit optical signals 115, which are wavelength-multiplexed together using a wavelength division multiplexer 120. The combined optical signals 125 include different WDM channels and/or signals that are transmitted through a series of optical fiber spans 130 using optical amplifier repeaters 140. It will be understood that any suitable number of optical fiber spans and optical amplifier repeaters can be used in the transmission system 105. Then, using a wavelength division demultiplexer 150, the WDM channels are wavelength-demultiplexed and directed to one or more receivers 160.

At least one of the receivers 160 can include PMD measurement logic 170 in accordance with some embodiments of the present invention. Alternatively, a separate specialized hardware test and measurement instrument 180, which includes the PMD measurement logic 170, may be connected to the transmission system via a tap coupler such as tap coupler 175, so that it can observe the WDM signals without interrupting them. The hardware test and measurement instrument 180 and/or the receiver 160 including the PMD measurement logic 170, are sometimes referred to herein as PMD measurement equipment, or simply, hardware instrument. The PMD measurement equipment may be located at or near to the receive terminal (e.g., at tap coupler 175), so as to measure the PMD of the entire link, and/or at an intermediate location (e.g., at tap coupler 185) so that the PMD of part of the link is measured. Optionally, the PMD measurement may be a reference-based measurement, as discussed in further detail below. In this case, a record of the signal can be obtained from the transmitter (e.g., at tap coupler 195).

In some embodiments, one hardware instrument 180 may be connected at or near to the transmitter 110 at the same time as a different hardware instrument 180 is connected at or near to the receiver 160. In some embodiments, one hardware instrument 180 may be connected at or near to the transmitter 110 and a historic record of the transmitter signal acquired by the hardware instrument 180, for later processing. Another alternative is that the transmitter 110 may be previously characterized in a factory prior to deployment into the field. In other words, before the transmitter 110 is connected to the fiber optic transmission system 105, the transmitter 110 can be tested in the factory (or other suitable laboratory or testing facility), and a record of the measurement can be stored for use in a later reference-based PMD measurement.

II. PMD Measurement

PMD measurement involves detecting the optical signal in a phase and polarization diverse coherent receiver and digitizing multiple (e.g., four) electric field components. Conventional coherent receivers are known to those in the optical communications industry, and are described, for example, in the industry standard document "Implementation Agreement for Integrated Dual Polarization Intradyne Coherent Receivers" (IA # OIF-PDC-RX-01.1, 2011) published by Optical Interconnect Forum (Fremont, Calif.).

Figure 2:
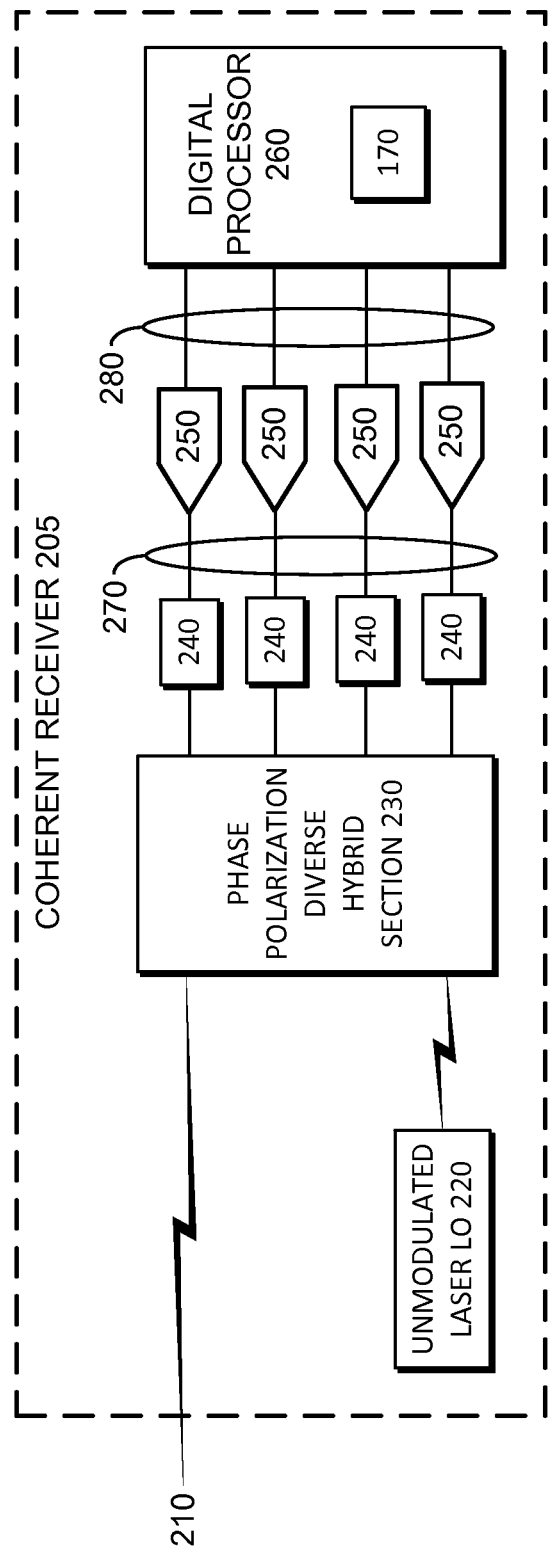
FIG. 2 is an example block diagram of the coherent receiver including the PMD measurement logic of FIG. 1 in accordance with some embodiments of the present invention.

FIG. 2 is an example block diagram of the coherent receiver 205 including the PMD measurement logic 170 of FIG. 1 in accordance with some embodiments of the present invention. The incoming optical signal 210 is mixed with light from an unmodulated laser 220 (i.e., the local oscillator or LO) in the phase/polarization diverse hybrid 230. The local oscillator laser 220 is typically tuned to overlap the spectrum of the incoming optical signal 210. The outputs of the phase/polarization diverse hybrid 230 are converted to electrical signals 270 by photodetectors 240, and the electrical signals 270 are digitized by analog-to-digital converters 250 to produce digitized signals 280. The digital representation of the signal (i.e., 280) is processed by a digital processor 260, and may use PMD measurement logic 170, as is described in further detail below, in order to compute a set of PMD coefficients.

The receivers (e.g., 160 of FIG. 1) in the optical transmission system (e.g., 105 of FIG. 1), whose purpose is to obtain the information content of a signal in real time, can have the same or similar structure to that of the coherent receiver 205 shown in FIG. 2. The ability to measure PMD using embodiments of the present invention can be included in such a receiver by incorporating the PMD measurement processing steps into the functionality of the digital processor 260, as explained in further detail below.

Moreover, the receiver 205 of FIG. 2 can be associated with a coherent lightwave signal analyzer (CLSA). The CLSA is a test and measurement instrument, which can measure and display many aspects of the optical signal. The OM4000 made by Tektronix Inc. (Beaverton, Oreg.) is an example of a CLSA. As test equipment, the CLSA does not recover all of the bits of information content in real time. Instead, a finite interval of time is digitized and stored, and then the digital processor 260 can operate on the stored digital representation at a slower speed than the signaling rate, to compute the PMD. In other words, the processing steps discussed herein can be performed by a real time receiver (e.g., 160), or alternatively, by a part time CLSA (e.g., 180), or both.

III. Calculation of PMD

The light propagating through an optical fiber is by nature an oscillating electric field. The direction of the oscillation is referred to as the state of polarization of the light. A convenient representation of the SOP is the Poincaré sphere, which is explained in "Optics" by E. Hecht (Addison Wesley, 4th ed., 2001). The Poincaré sphere is a virtual construct. The three dimensions of Poincaré space are not the same as the three dimensions of real space in which the optical fiber exists. Every possible state of polarization is mapped to a different point on the surface of the sphere. PMD has the effect of rotating the Poincaré sphere as the optical frequency of the light is changed.

Figure 3:
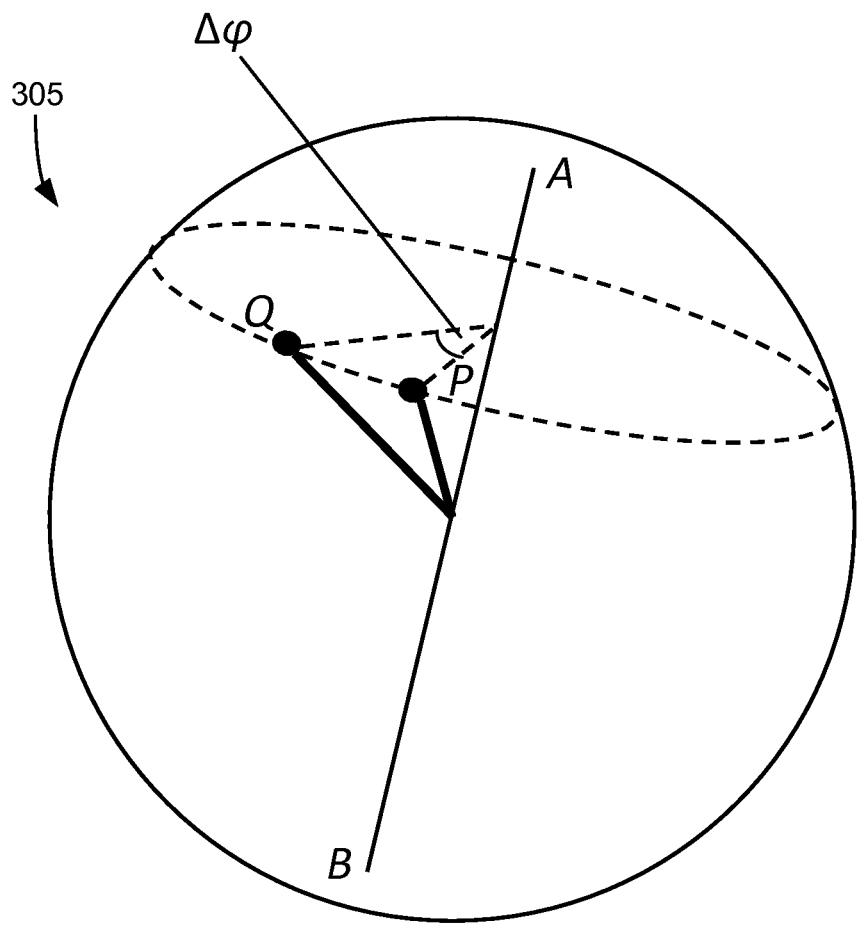
FIG. 3 is an example diagram of a Poincaré sphere showing an example of the state of polarization of light at two frequencies.

FIG. 3 is an example diagram of a Poincaré sphere 305, showing an example of the SOP of light at two frequencies, $\omega_0$ (i.e., state P) and $\omega_0 + \Delta\omega$ (i.e., state Q). The SOP is rotated by an angle $\Delta\phi$ about an axis AB, from $\omega_0$ to $\omega_0 + \Delta\omega$. Given that $\Delta\omega$ is small, the first order PMD is defined as a vector pointing in the direction of the rotation axis AB, whose magnitude is $\Delta\phi/\Delta\omega$. The magnitude of the vector is expressed in units of time, and is equal to the time delay between the fast and slow axes due to the PMD. The task of measuring the PMD, therefore, involves estimating the angle of rotation ($\Delta\phi$) and axis of rotation (AB) on the Poincaré sphere 305.

The conventional method using the Jones matrix eigenanalysis measurement approach sends two closely spaced wavelengths (i.e., optical frequencies) through the fiber, and measures the SOP of each on the polarimeter at the far (i.e., receiving) end. Observation of the movement of one SOP is not sufficient to define the PMD vector, since there are many possible axes of rotation, and associated with each axis is a different angle of rotation, which go from one point to a second point on the Poincaré sphere. The JME method therefore sends several different SOPs through the fiber successively and measures each output SOP on the polarimeter. The axis and angle of rotation are exactly defined given several pairs of points at $\omega_0$ and $\omega_0+\Delta\omega$. The mathematics to deduce the angle and axis of rotation, and hence the PMD coefficients, is given in the aforementioned papers by B. L. Heffner. To measure the PMD up to order n requires n+1 wavelengths. In the conventional art, for example, two wavelengths are required to measure first order PMD only, and three wavelengths to measure first and second order, and so forth.

Embodiments of the present invention estimate the PMD from the optical spectrum of the signal that has passed through the optical fiber. The spectrum, which is a representation of the signal as a function of frequency $\omega$, can be obtained by applying a digital Fourier transform to the digitized signal as a function of time. With a polarization multiplexed signal, given that the information content of the signal is random, each element of the spectrum has a random state of polarization. On the Poincaré sphere, the spectral elements appear oriented in different directions. The form of the spectrum on the Poincaré sphere is different at the output of the fiber (i.e., the receiving end) compared to the input (i.e., the transmitting end).

All spectral elements are rotated together by a fixed rotation transformation associated with the transit over the long fiber distance, and in addition, there is a rotation of the spectral elements as a function of frequency $\omega$. Embodiments of the present invention include measuring the PMD from the frequency-dependent rotation of the spectrum. There are significant differences between the embodiments of the present invention and the Jones matrix eigenanalysis method. Here, a spectrum, in accordance with embodiments of the present invention, has many points. For example, if the spectrum is calculated from an interval of 10,000 time samples, then the spectrum has 10,000 points. The SOP of each point individually has a large uncertainty due to unavoidable additive noise, so that selecting a small number of points and performing Jones matrix eigenanalysis on them would lead to a PMD value having a significant error. In contrast, by using the majority of the points in the spectrum, according to inventive aspects described herein, a more accurate PMD value is obtained. Put differently, unlike the Jones matrix eigenanalysis technique, this technique includes fitting a curve to many data points associated with the spectra to obtain a relatively small number of orders of PMD.

To obtain an accurate PMD value, the same interval of time relative to the input of the fiber (i.e., transmitting end) and the output of the fiber (i.e., receiving end) is compared. In other words, the spectrum of exactly or substantially the same interval of time, which contains the same bits or substantially the same bits of information content, between the input and output of the fiber, is compared, to see a valid rotation due to PMD. By way of further explanation, a first spectrum is generated based on the signal record obtained at the input of the fiber, a second spectrum is generated based on the signal record obtained at the output of the fiber for the same time period, and the two spectra are compared to each other. Various examples are presented below for ensuring that the same interval of time is compared.

Embodiments of the present invention include calculating a rotation phase vector $\Phi$ as a function of optical frequency $\omega$. $\Phi$ is a vector in Poincaré space whose magnitude, measured in radians, is equal to the angle of rotation from a fixed frequency $\omega_0$ to $\omega$. The orientation of $\Phi(\omega)$ is the axis of rotation from $\omega_0$ to $\omega$. $\Phi$ is different from the differential rotation vector, a quantity which often appears in relation to PMD, which is the angle of rotation from $\omega$ to $\omega+\delta\omega$, where $\delta\omega$ is small. Instead, $\Phi(\omega)$ relates to the rotation from $\omega_0$ to $\omega$, and the difference between these frequencies may be large. $\omega_0$ is conveniently chosen to be located at the center of the signal spectrum. Since the movement of a single point on the Poincaré sphere is insufficient to define the angle and axis of rotation, $\Phi(\omega)$ may be calculated from the rotation of a set of points near $\omega_0$ to a new set of points near $\omega$, using the mathematics of Jones matrix eigenanalysis.

An alternative way to calculate $\Phi(\omega)$ is to express the optical spectrum as quaternion values instead of points on the Poincaré sphere for each of the input and output spectra. Then a rotation quaternion representing the rotation from the input to the output of the fiber is obtained by dividing the quaternion values of the output spectrum by the quaternion values of the input spectrum. $\Phi(\omega)$ may then be calculated from the rotation quaternion at $\omega$. Conventional approaches for using quaternions to represent PMD-induced rotations are described in "Quaternion Approach to PMD and PDL Phenomena in Optical Fiber Systems" by M. Karlsson and M. Petersson (IEEE J. Lightwave Technol., vol. 22, p. 1137-1146, 2004).

Given a set of values of $\Phi(\omega)$, the next step is to calculate n orders of PMD coefficients and to fit $\Phi(\omega)$ to an nth order polynomial in $\omega-\omega_0$. Conventional approaches for using polynomial fit methods are described in "Introduction to Linear Regression Analysis" by D. C. Montgomery et al. (Wiley, 5th ed., 2012). The polynomial fit, in accordance with embodiments of the present invention, uses all the values in the spectrum, and averages out the effect of additive noise. Thus, the fitted polynomial can be written as:

$$\Phi_{fit}(\omega)=\Omega_0+\Omega_6(\omega-\omega_0)+\tfrac{1}{2}\Omega_2(\omega-\omega_0)^2+\ldots$$

where $\Omega_1$ is the first order PMD coefficient, $\Omega_2$ is the second order PMD coefficient, and so on. In such manner, the PMD can be determined and expressed as the set of coefficients as obtained and described herein. The various embodiments of the invention disclosed herein are not intended to be limited to the aspect in which a rotation vector $\Phi(\omega)$ in Poincaré space is calculated, and then fitted to a polynomial. The polarization change caused by PMD has many degrees of freedom associated with it mathematically, and there may be other mathematical ways to express the polarization change, other than as a rotation in Poincaré space. The aspect of the invention described here is that a mathematical fit is used to calculate the PMD coefficients to an order which is a small number compared to the number of points in the two records being compared.

The PMD measurement techniques, in accordance with embodiments of the present invention, compare the spectrum of the signal at the input (i.e., transmitting end) of the optical fiber to the spectrum of the signal at the output (i.e., receiving end) of the optical fiber. As mentioned above, the spectrum is calculated for the interval of time containing the same information bits in order for the PMD result to be accurate. Ensuring that the spectra from each of the ends of the optical fiber cover the same interval of time can be accomplished in a variety of ways, as further described below.

Figure 4:
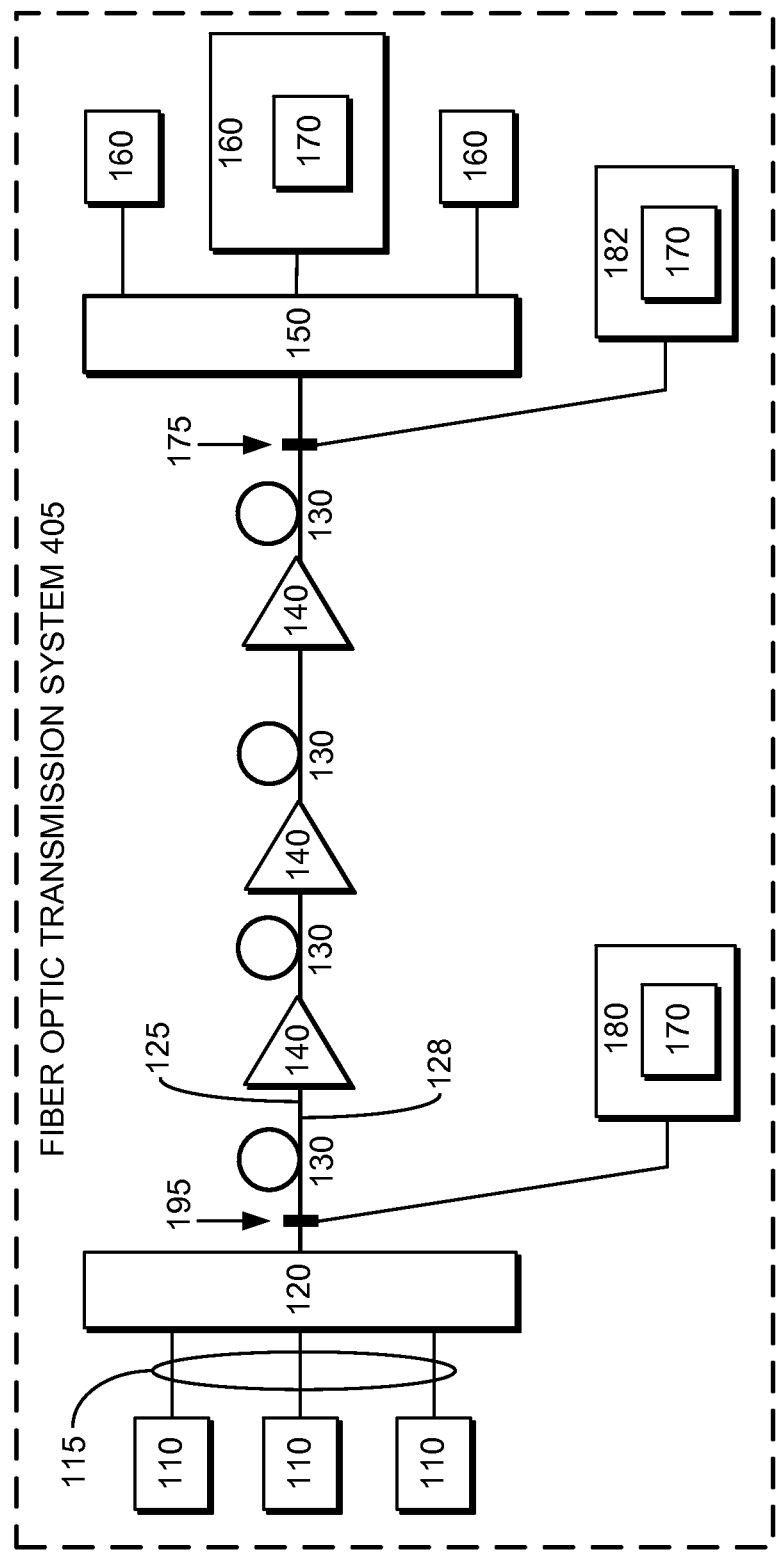
FIG. 4 is an example diagram of a fiber optic transmission system including two different hardware instruments coupled to different ends of the optical fiber for PMD measurement and analysis in accordance with embodiments of the present invention.

FIG. 4 is an example block diagram of a fiber optic transmission system 405 including two different hardware instruments (e.g., 180 and 182) coupled to different ends of the optical fiber 128 for PMD measurement and analysis in accordance with embodiments of the present invention. Each of the hardware instruments 180 and 182 can be a coherent receiver and/or other suitable test and measurement instrument or hardware instrument, which may include the PMD measurement logic 170. In this example, both of the hardware instruments 180 and 182 are connected to the transmission system 405 at the same time, each monitoring the same WDM channel, thereby enabling the same time interval to be sampled. In other words, one hardware instrument 180 can be situated at or near the input of the optical fiber 128 and the other at or near the output of the optical fiber 128.

A precise timing reference can be used by each of the hardware instruments 180 and 182, which allows them to capture the same interval of the signal. The time taken to transit the optical fiber should be taken into account in the analysis, which provides higher accuracy in synchronizing different data captures by each of the hardware instruments. In some embodiments, the two captured data records may be transmitted, either offline or via the optical fiber or other suitable network, to separate PMD measurement logic of a different hardware unit having a digital processor to assist in the processing thereof, to calculate the PMD in accordance with the inventive techniques described herein. In some embodiments, the captured data records can be analyzed and/or processed by one of the hardware instruments 180 or 182.

Alternatively, a coarse timing reference may be employed, such that the intervals recorded by the two hardware instruments 180 and 182 are not identical, but otherwise overlap in time to some extent. Then the PMD measurement logic 170 may examine the information content of the two records to locate the overlap region. Once the overlap region is located, the PMD measurement logic 170 can calculate the PMD from the overlap region alone.

Figure 5:
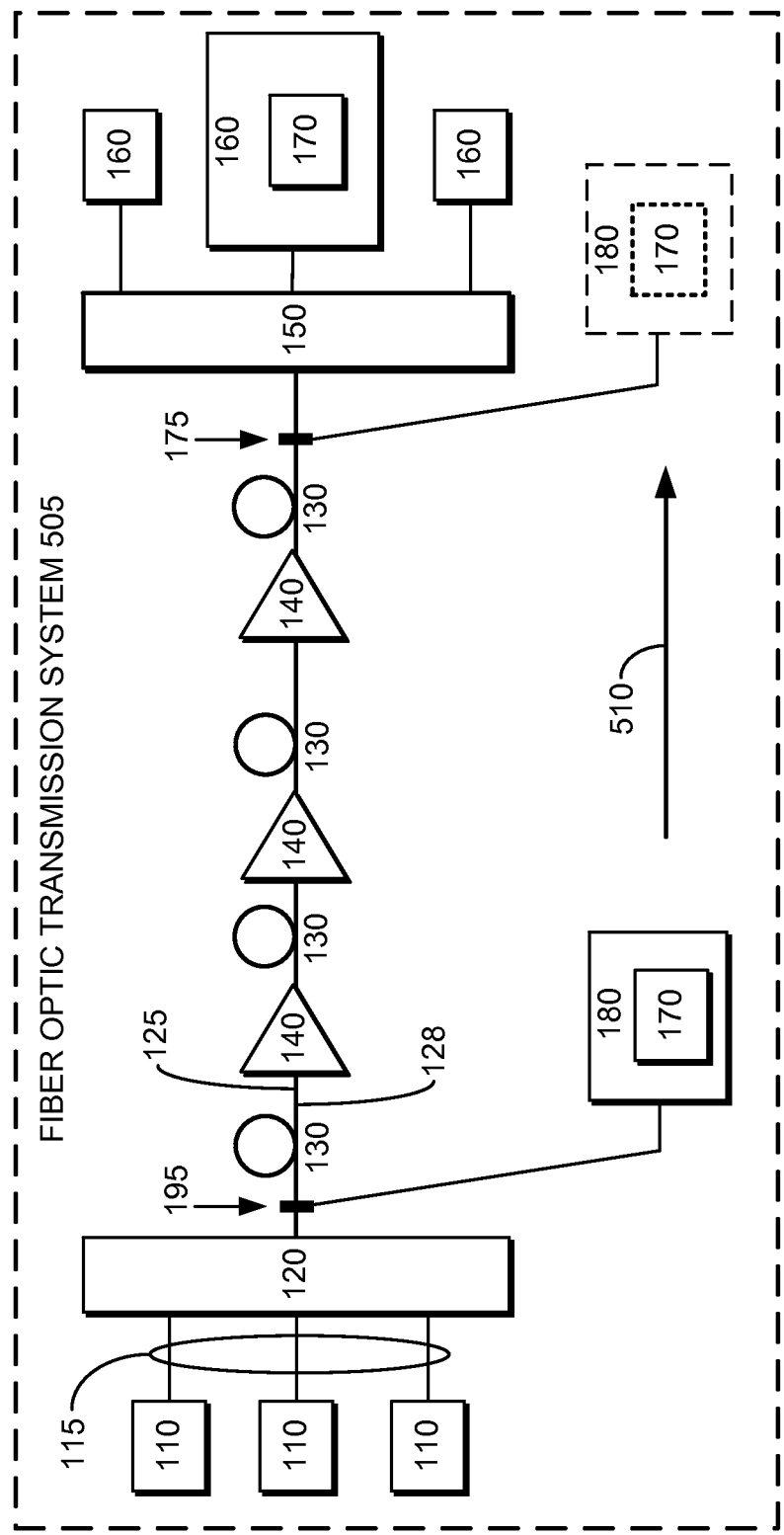
FIG. 5 is an example diagram of a fiber optic transmission system including a hardware instrument coupled to one end of the optical fiber to obtain a first record and then transported to another end of the optical fiber to obtain a second record for PMD measurement and analysis in accordance with embodiments of the present invention.

FIG. 5 is an example diagram of a fiber optic transmission system 505 including a hardware instrument 180 coupled to one end of the optical fiber to obtain a first record. Hardware instrument 180 is then transported to the other end of the optical fiber to obtain a second record for PMD measurement and analysis in accordance with embodiments of the present invention.

In the embodiments described with reference to FIGS. 4 and 5, the optical signal 125 can contain repeated portions of the same data content, such as header information or framing information. Records of the input and output optical signal may be captured at different times, such as by employing one coherent receiver and physically relocating it from one end of the fiber to the other. For example, the hardware instrument 180 can capture a first record by measuring an information-bearing optical signal when it is attached at or near to the transmitter end of a section of optical fiber. The same hardware instrument (e.g., 180) or different hardware instrument (e.g., 182 of FIG. 4) can capture a second record when it is attached at or near to the receiver end of the optical fiber. For example, as shown in FIG. 5, the hardware instrument 180 can be transported to a different location near to the receiving end of the optical fiber, as indicated by arrow 510. The hardware instrument 180 can then be attached at or near to the receiving end of the section of optical fiber, and can capture the second record at the receiving end. The first and second captured records can then be compared. The digital processor may then locate the region of repeated information in the two records, and apply the PMD calculation only to that interval of time having the repeated information.

In some embodiments, records of the optical signal are captured at the input and output of the optical fiber, and are taken at different times such that different information content is captured (i.e., non-repeating information). One of the records, for example captured from at or near the input end (i.e., transmitting end) of the fiber, can be used to calculate the impulse response associated with the optical transmitter 110. The impulse response is based on the assumption that there is a linear relationship between the optical signal output from the transmitter and the information content bits. The impulse response may be obtained by deconvolving the observed signal with the information content bits. After capturing the record from at or near the output end (i.e., receiving end) of the fiber, a virtual transmitter signal or virtual record may be formed by convolving the transmitter impulse response with the actual data content of the captured record from the output end of the optical fiber, thereby forming two records having substantially the same data content. In this manner, two records may be compared—one from the output of the optical fiber and the other from the input end (e.g., the virtual record), which have the same or virtually the same data content. The PMD may be calculated or otherwise measured from these two records. Alternatively, the impulse response of both input and output records may be calculated, and then the PMD calculated by comparing the impulse responses. A second alternative is to apply those two impulse responses, from the input and output record, to information content which is not the information content in either record to calculate two virtual records, and then determine the PMD from the two virtual records.

Figure 6:
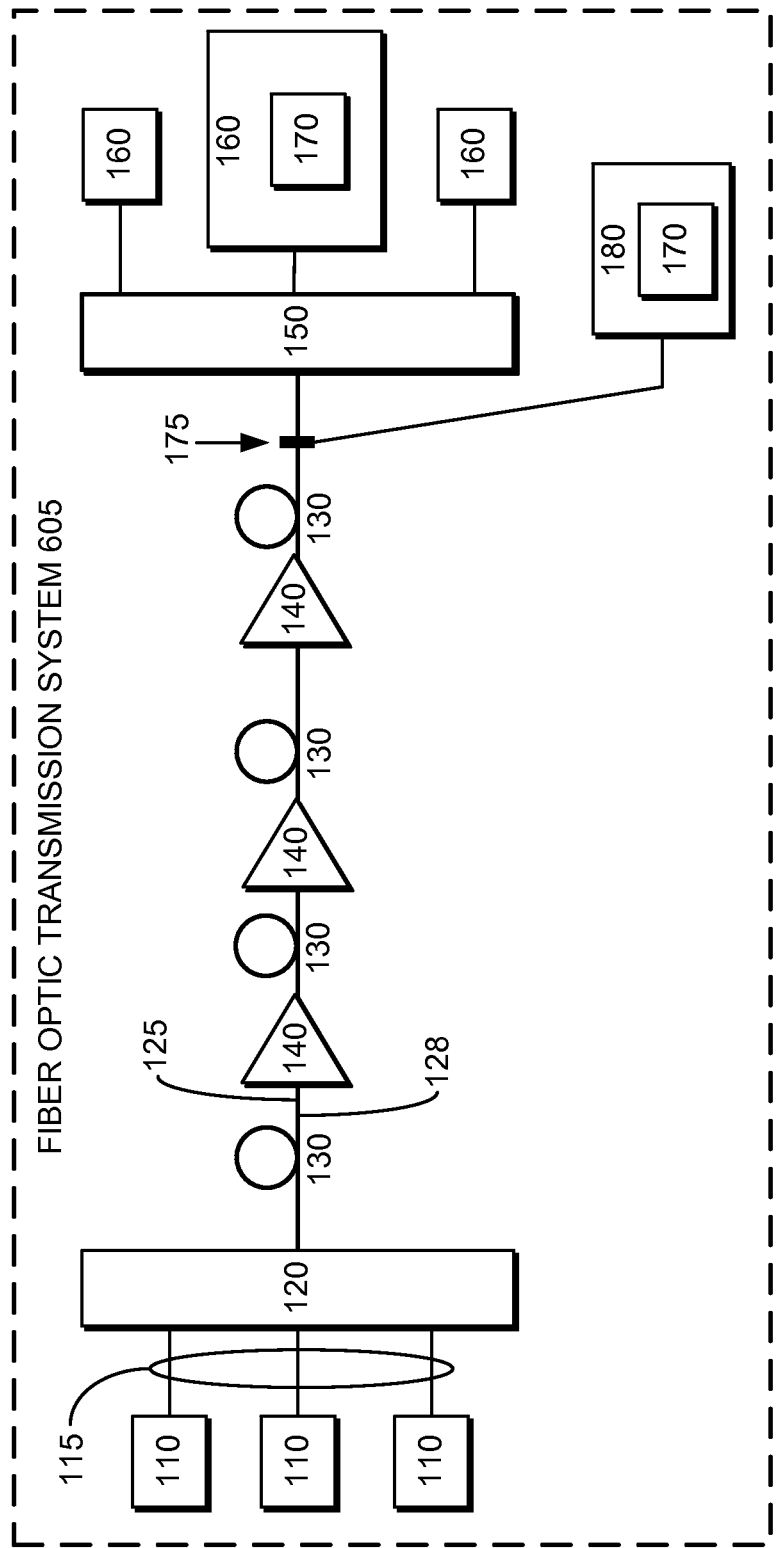
FIG. 6 is an example diagram of a fiber optic transmission system including a hardware instrument coupled to the output or receiving end of the optical fiber to obtain a record, for PMD measurement and analysis in accordance with embodiments of the present invention.

FIG. 6 is an example diagram of a fiber optic transmission system 605 including a hardware instrument 180 coupled to the output or receiving end of the optical fiber to obtain a record, for PMD measurement and analysis in accordance with embodiments of the present invention.

In this embodiment, a virtual input end record is generated by convolving the actual data content of the output end record with a nominal impulse response. The nominal impulse response is not necessarily acquired from the same physical transmitter that produces the signal for the output end record. Rather, the nominal impulse response may be taken from a similar transmitter 110 that has been characterized at a factory (or other suitable laboratory or testing facility), or from the design target for the impulse response of the transmitter 110.

In other words, after capturing the record from at or near the output end (i.e., receiving end) of the fiber, a virtual transmitter signal or virtual record may be formed by convolving the nominal impulse response with the actual data content of the captured record from the output end of the optical fiber, thereby forming two records having substantially the same data content. In this manner, two records may be compared, one from the output of the optical fiber and the other the virtual input end record, which have the same data content. The PMD may be calculated from these two records.

If the nominal impulse response deviates from the actual impulse response of the transmitter, then that means there may be an error in the calculated PMD. The advantage of this embodiment is that the PMD may be measured based only on an observation of the optical signal at the output end (i.e., receiving end).

Figure 7:
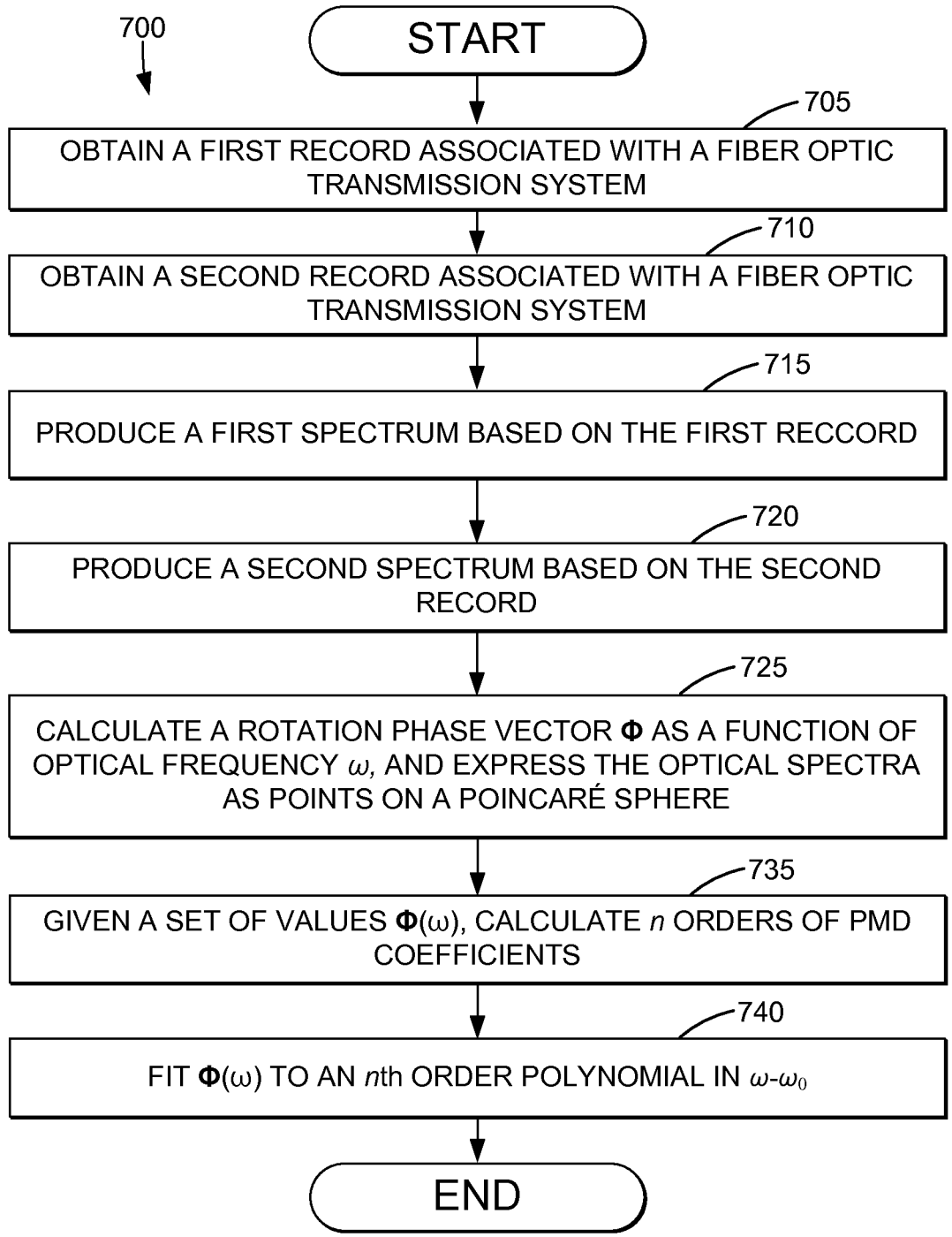
FIG. 7 is an example flow diagram illustrating a technique for determining PMD, according to some embodiments of the present invention.

FIG. 7 is an example flow diagram 700 illustrating a technique for determining PMD, according to some embodiments of the present invention. The technique begins at 705, where a first record is obtained or otherwise generated by a coherent receiver or other suitable test and measurement instrument or hardware instrument. For example, the first record can be generated or obtained at or near the input or transmitting end of the fiber optic transmission system, or alternatively, a virtual record can be generated, as described in detail above. The flow proceeds to 710, where a second record is obtained or otherwise generated by the coherent receiver or other suitable test and measurement instrument or hardware instrument. For example, the second record can be generated or obtained at or near the output end or receiving end of the fiber optic transmission system, or alternatively, a virtual record can be generated, as described in detail above.

At 715, a first spectrum is produced, by the hardware instrument, based on the first record. The first spectrum is a representation of the signal from the input end as a function of frequency $\omega$, and can be obtained by applying a digital Fourier transform to the first record as a function of time, as described above. At 720, a second spectrum is produced, by the hardware instrument, based on the second record. The second spectrum is a representation of the signal from the output end as a function of frequency $\omega$, and can be obtained by applying a digital Fourier transform to the second record as a function of time, as described above.

The flow proceeds to 725, where a rotation phase vector $\Phi$ is calculated as a function of optical frequency $\omega$ to produce a set of values $\Phi(\omega)$. The first and second optical spectra can be expressed as points on a Poincaré sphere or alternatively expressed as quaternion values, as explained above. Given the set of values $\Phi(\omega)$, n orders of PMD coefficients are to be calculated. Thereafter, $\Phi(\omega)$ can be fit to an nth order polynomial in $\omega-\omega_0$, as also described in detail above. Thus, more accurate PMD can be measured, calculated, determined, and/or expressed as the set of coefficients as obtained and described herein.

It should be understood that the determinations in the flow diagram 700 need not occur in the specific order as described, but rather, these determinations can be made at different times and by the same or different hardware instruments or other suitable digital processors. It will also be understood that the steps described in these techniques need not necessarily occur in the order as illustrated or described.

Although the foregoing discussion has focused on particular embodiments, other configurations are contemplated. The following discussion is intended to provide a brief, general description of a suitable machine or machines in which certain aspects of the inventive concept can be implemented. Typically, the machine or machines include a system bus to which is attached processors, memory, e.g., random access memory (RAM), read-only memory (ROM), or other state preserving medium, storage devices, a video interface, and input/output interface ports. The machine or machines can be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, a virtual machine, or a system of communicatively coupled machines, virtual machines, or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine or machines can include embedded controllers, such as programmable or non-programmable logic devices or arrays, Application Specific Integrated Circuits (ASICs), embedded computers, smart cards, and the like. The machine or machines can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciated that network communication can utilize various wired and/or wireless short range or long range carriers and protocols, including radio frequency (RF), satellite, microwave, Institute of Electrical and Electronics Engineers (IEEE) 545.11, Bluetooth®, optical, infrared, cable, laser, etc.

Embodiments of the inventive concept can be described by reference to or in conjunction with associated data including functions, procedures, data structures, application programs, etc. which when accessed by a machine results in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data can be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access. Embodiments of the inventive concept may include a non-transitory machine-readable medium comprising instructions executable by one or more processors, the instructions comprising instructions to perform the elements of the inventive concept as described herein.

Other similar or non-similar modifications can be made without deviating from the intended scope of the inventive concept. Accordingly, the inventive concept is not limited except as by the appended claims.

What is claimed is:

1. A method for determining instantaneous polarization mode dispersion in a section of optical fiber, the method comprising:

acquiring a first record by obtaining by a coherent receiver, an output record at or near a receiving end of the section of optical fiber by measuring an information-bearing optical signal at the receiving end of the section of optical fiber;

acquiring a second record by obtaining by the coherent receiver, an input record at or near a transmitting end of the section of optical fiber by measuring the information-bearing optical signal at the transmitting end of the section of optical fiber, in which the first and second records are associated with substantially the same interval of time;

comparing the first record with the second record, and calculating the instantaneous polarization mode dispersion experienced by the optical signal based on the comparison.

2. The method of claim 1, further comprising:

calculating an impulse response associated with the signal acquired in at least one of the input or output record; and employing the impulse response in the comparison of the input and output records to calculate the instantaneous polarization mode dispersion.

3. The method of claim 2, further comprising:
forming a virtual record by convolving the impulse response obtained from one of the input or output records with data content of the other of the input or output records.

4. The method of claim 3, wherein:
comparing includes comparing the virtual record to one of the input or output records; and
calculating the instantaneous polarization mode dispersion includes calculating the instantaneous polarization mode dispersion based on the comparison of the virtual record to one of the input or output records.

5. The method of claim 1, wherein: comparing includes locating an overlap region within the first and second records, wherein the overlap region contains the same information content of the optical signal.

6. The method of claim 1, wherein calculating includes fitting a curve to a plurality of data points associated with the first and second records.

7. The method of claim 6, further comprising:
producing a first spectrum based on the first record; and
producing a second spectrum based on the second record spectra.

8. The method of claim 7, wherein:
the plurality of data points are associated with the first and second spectra; and
calculating includes fitting the curve to the plurality of data points associated with the first and second spectra.

9. The method of claim 7, further comprising:
calculating a rotation phase vector $\Phi$ as a function of optical frequency $\omega$.

10. The method of claim 9, further comprising:
producing a set of values $\Phi(\omega)$; and
fitting the set of values $\Phi(\omega)$ to an nth order polynomial, thereby calculating n orders of instantaneous polarization mode dispersion coefficients.

11. The method of claim 1, wherein the optical signal is not a polarization bit interleaved signal.

12. A system for determining instantaneous polarization mode dispersion in a section of optical fiber, comprising:
a first coherent receiver configured to acquire a first record by measuring an information-bearing optical signal at an output of the section of optical fiber;
a second coherent receiver configured to acquire a second record by measuring the optical signal at an input of the section of optical fiber;
instantaneous polarization mode dispersion measurement logic configured to compare the first record with the second record and to calculate instantaneous polarization mode dispersion experienced by the optical signal based on the comparison.

13. The system of claim 12, wherein the first and second records are associated with substantially the same interval of time.

14. The system of claim 13, wherein:
the first coherent receiver is configured to acquire the first record at or near a receiving end of the section of optical fiber; and
the second coherent receiver is configured to acquire the second record at or near a transmitting end of the section of optical fiber, such that the first and second records contain the same interval of time of the optical signal.

15. The system of claim 12, wherein the instantaneous polarization mode dispersion measurement logic is configured to fit a curve to a plurality of data points associated with the first and second records.

16. The system of claim 15, wherein the instantaneous polarization mode dispersion measurement logic is configured to:
produce a first spectrum based on the first record; and
produce a second spectrum based on the second record.

17. The system of claim 16, wherein:
the plurality of data points are associated with the first and second spectra; and
the instantaneous polarization mode dispersion measurement logic is configured to fit the curve to the plurality of data points associated with the first and second spectra.

18. The system of claim 12, wherein the optical signal is not a polarization bit interleaved signal.

19. A coherent receiver apparatus, comprising:
a hybrid section configured to receive and mix an optical signal with a local oscillator signal, and to produce a plurality of optical signals;
a plurality of photodetectors configured to receive the plurality of optical signals from the hybrid section and to produce a plurality of electrical signals;
a plurality of digitizers configured to receive the plurality of electrical signals from the plurality of photodetectors and to produce a plurality of digitized signals; and
a digital processor configured to receive and process the digitized signals, wherein the digital processor includes instantaneous polarization mode dispersion measurement logic to compute a set of instantaneous polarization mode dispersion coefficients based on the digitized signals, wherein the digital processor is further configured to:
acquire a first record by measuring an information-bearing optical signal at an output of a section of optical fiber;
compare the first record with a second record, wherein the second record is of the optical signal at an input of the section of optical fiber; and
calculate instantaneous polarization mode dispersion experienced by the optical signal based on the comparison.

20. The apparatus of claim 19, wherein the digital processor is configured to fit a curve to a plurality of data points associated with the first and second records.

21. The apparatus of claim 20, wherein the digital processor is configured to:
produce a first spectrum based on the first record; and
produce a second spectrum based on the second record.

22. The apparatus of claim 21, wherein:
the plurality of data points are associated with the first and second spectra; and
the digital processor is configured to fit the curve to the plurality of data points associated with the first and second spectra.

23. The apparatus of claim 19 in which the coherent receiver apparatus acts as a receiver in a fiber optic communications system, the receiver being configured to estimate information content of the information-bearing optical signal and to produce said information content as an output.

24. The apparatus of claim 19, wherein the optical signal is not a polarization bit interleaved signal.

25. A method for determining instantaneous polarization mode dispersion in a section of optical fiber, the method comprising:
acquiring a first record by obtaining, by a first coherent receiver, the first record at or near a receiving end of the section of optical fiber by measuring an information-bearing optical signal at an output of the section of optical fiber;

acquiring a second record by obtaining, by a second coherent receiver, the second record at or near a transmitting end of the section of optical fiber by measuring the information-bearing optical signal at an input of the section of optical fiber, in which the first and second records are associated with the same interval of time of the optical signal;

comparing the first record with the second record; and calculating the instantaneous polarization mode dispersion experienced by the optical signal based on the comparison.

\* \* \* \* \*